BINARY CODED INDICATION TRANSMITTING CIRCUITS
FOR REMOTE CONTROL SYSTEMS
Filed Dec. 1, 1958
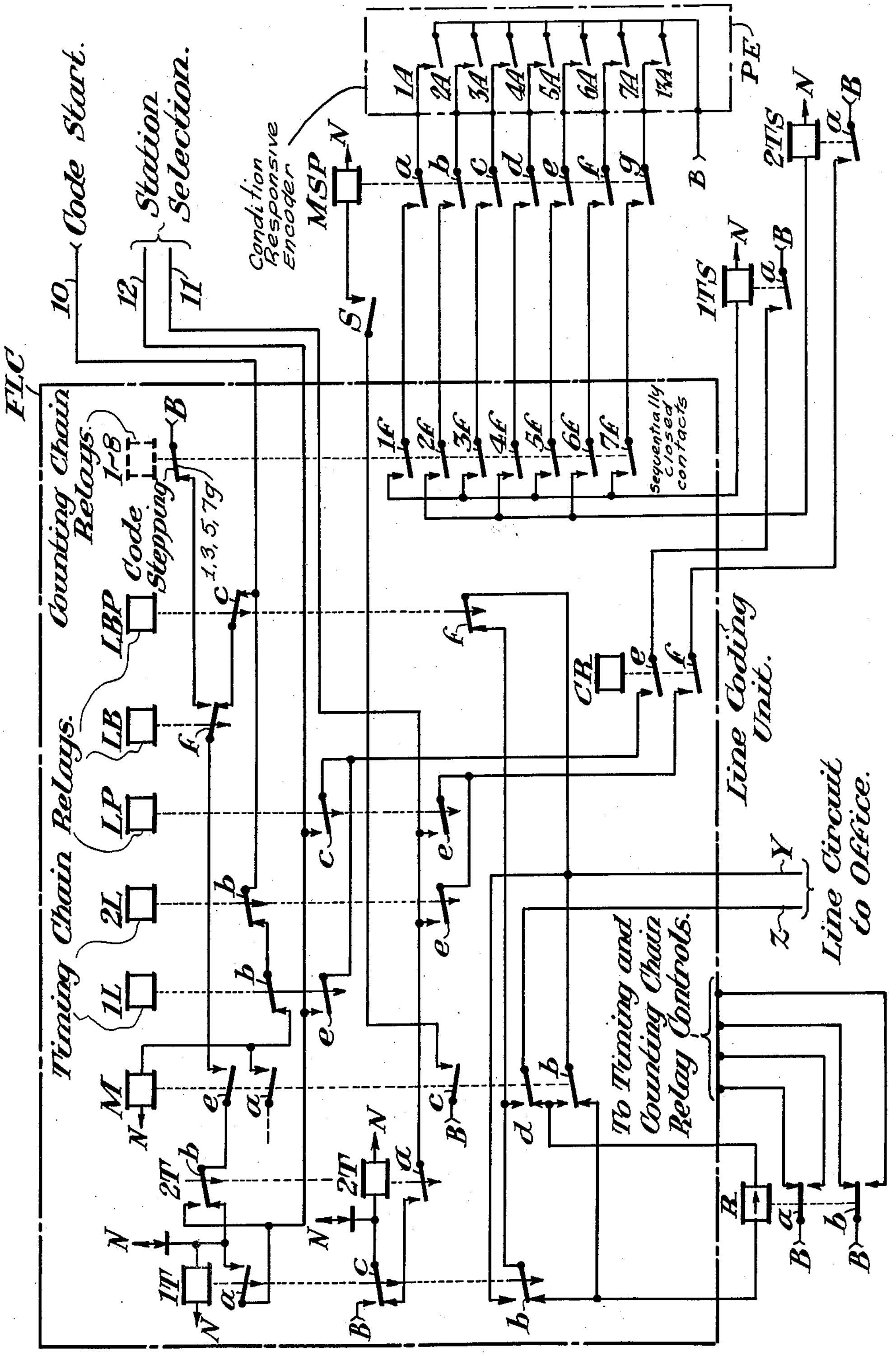

United States Patent Office 3,011,149

Patented Nov. 28, 1961

3,011,149

BINARY CODED INDICATION TRANSMITTING CIRCUITS FOR REMOTE CONTROL SYSTEMS

Donald B. Funston, Edgewood, Pa., assignor to Westinghouse Air Brake Company, Wilmerding, Pa., a corporation of Pennsylvania Filed Dec. 1, 1958, Ser. No. 777,254

7 Claims. (Cl. 340—147)

My invention pertains to binary coded indication transmitting circuits for remote control systems. More particularly, my invention pertains to a circuit arrangement for characterizing each code step of an indication code transmitted from a remote station to the office or central recording location in a coded remote control system.

It is becoming more and more the practice to transmit indications of many types over coded remote control systems which are used to provide supervisory control of the installation from which the indications are needed. As specific examples, the flow rate and air or liquid pressure data in pipe-line control systems are now frequently transmitted in code form from remotely controlled stations to the central control office. These items are converted by various types of encoders available in the art into a form, generally a binary code, which permits transmission by the coded remote control system. The binary code form is frequently used since each digit of such a code can be only one of two characters, that is, the numerals 1 or 0. Thus, in a time code system, the two characters of each binary code digit can be represented by the long and short pulses. If a polar code control system is used, the normal and reverse polarities are used to indicate the two characters. Thus, the transmission of the data by the indication code is similar to its regular use in which two position indication functions are transmitted.

However, the use of encoders to convert the original data into a form which can be transmitted by the code system generally presents a problem with the encoders available at the present time. The encoder contacts or brushes do not have the capacity for carrying sufficient current to control the relays in the coded remote control system. In prior installations in which such encoders are used, repeater relays requiring a very small current for operation, but provided with contacts capable of handling the larger currents required by the code system relays, have been used to repeat at the position of each encoder contact or brush. Thus, in such systems, a repeater relay is required for each encoder brush, that is, for example, for each digit of the binary code into which the data is converted for transmission. These repeater relays in turn control the code characterizing circuits and thus the transmitting arrangement of the remote control system being used. Obviously, considerable advantage may be obtained if the use of one repeater relay for each encoder contact can be eliminated.

Accordingly, it is an object of my invention to provide improved indication transmission circuits for remote control systems to control the transmission of encoded data.

Another object of my invention is to provide improved code characterizing circuits for remote control systems.

A further object of my invention is to provide an indication code characterizing circuit arrangement for data transmission systems which eliminate the requirement for a repeater relay for each digit of the data code.

Still another object of my invention is the provision of a circuit arrangement at a remote station in a control system to characterize the indication code directly from a data encoder without requiring a repeater relay for each code digit produced by the encoder.

A further object of my invention is the provision of a code characterizing arrangement for a remotely controlled station to permit the transmission of encoded data from that station over a time code remote control system and yet require a minimum number of repeater relays between the encoder and the transmission control circuits.

Other objects, advantages, and features of my invention will become apparent from the following specification when taken in connection with the accompanying drawing.

I shall now describe apparatus embodying one form of my invention as shown in the accompanying drawing and shall then point out the novel features thereof in the appended claims.

Referring now to the drawing, there is illustrated, in a diagrammatic manner, one form of the circuit arrangement at a remotely controlled station in a particular remote control system, which circuit arrangement embodies the features of my invention.

In practicing my invention, I provide two relays in addition to the normal coding apparatus at the remote station. These added relays alternately and momentarily register the code character for successive indication code steps. These relays are of a type which require only a small amount of current to sufficiently energize the relay windings for operation. One of these additional relays is energized as appropriate during the odd numbered indication code steps to register the indication functions during such steps. Each of a plurality of circuits is prepared, only when that station is active to transmit an indication code, by one of the odd numbered counting chain relays in order to establish the designated code step. The individual circuit associated with each odd numbered code step is finally completed as selected within the encoder device for the data being transmitted or such other arrangements as may be used. In the illustrated arrangement, each circuit is completed through the corresponding encoder brush contact if the numeral 1 is to be transmitted by that odd numbered code step. Circuits for the second additional relay are similar but are so controlled as to be completed during even numbered code steps. In the control system illustrated in the drawing, as a specific example, the first additional relay is used to provide energy for holding the first transmitter relay to create a long code step during the odd numbered steps while the second additional relay performs a similar operation for the second transmitter relay, creating long even numbered code steps. Further checks are made to assure that it is the function indicating portion of the station indication code during which this action of controlling the transmitter relays occurs. However, in other types of remote control systems which are known, the first additional relay could be used to hold the transmitter relay means energized for a long odd numbered code step while the second additional relay would hold the transmitter relay means deenergized to create a long even numbered code step. Thus the illustrated form of my invention may be applied with little change to any of the well-known time code remote control systems presently known in the art. Suitable modifications may be made, and is envisioned, to control the indication transmission in a polar code system.

It is to be noted that certain conventional symbols are used in the drawing in order to simplify the illustrated circuit arrangement for convenience in understanding the system operation. The apparatus shown in the drawing is supplied with a local source of direct current energy such as a battery. However, this battery is not shown as the use of such power sources is conventional, and only its positive and negative terminals are shown designated by the reference characters B and N, respectively. Certain of the relays illustrated are provided with slow release characteristics to provide a time interval prior to the opening of front contacts after the corresponding relay winding is deenergized. The contacts of such relays are designated in a conventional manner by a downward pointing arrow drawn through the movable portion of such contacts.

The station illustrated in the single figure of the drawing may be one station of a plurality of such stations in a remote control installation. The illustrated station may also be part of a single station control system as the arrangement of my invention is applicable to either type of installation. I have chosen to illustrate my invention as applied to a remote control system of the type illustrated in Letters Patent of the United States No. 2,698,425, issued December 28, 1954 to A. B. Miller for a Remote Control System. However, it is to be understood that other systems may also be used. The slight differences which will exist in the circuit arrangement or circuit operation will be discussed hereinafter at the proper time in the system description. The station line coding unit FLC, shown in a conventional manner by a dot-dash rectangle in the drawing, is that of the Miller system, particularly as shown in the various parts of FIG. 2 of the reference patent. However, only such circuits as are necessary for a complete understanding of my invention are here shown within this unit FLC as the complete circuit arrangement and system description are available in the reference patent. As an aid to the understanding of the present invention, insofar as possible the reference characters used in the present drawing are the same reference characters used in the circuits shown in the Miller patent, both for the relays and for the various contacts which are identical with those of the prior system.

Across the top of the drawing, within the dot-dash rectangle representing unit FLC, are shown the windings of the timing chain relays 1L, 2L, LP, LB, and LBP. No control circuits are shown for these relays as these circuits and the chain operation are identical with those shown and described in the previously mentioned Miller system. It is sufficient to here understand that, at the beginning of an indication code, these relays pick up in cascade, relays 1L and 2L picking up initially followed in sequence by relays LP, LB, and LBP. This energizing and pickup action occurs during the first code step. The timing relays 1L and 2L release alternately on odd and even numbered long code steps, but although deenergized, hold their front contacts closed during the short code steps since the slow release period for each relay is of longer duration than a short code step. The timing repeater relay LP likewise releases during long code steps, being deenergized by the release of either relay 1L or 2L. Obviously, this relay remains energized during short code steps since neither of the timing relays releases at that time. Bridging relay LB and bridging repeater relay LBP hold their front contacts closed during an entire indication code even though the winding of relay LB may be briefly deenergized by the release of relay LP.

Adjacent to the timing chain relays on the right is shown a dotted representation of the counting chain relays 1 to 8 of the Miller system. Contacts shown connected to this relay 1—8 represent contacts of the various counting chain relays or may represent a similar contact on one or more of the counting chain relays. For example, the contact immediately below the dotted representation of the relay winding, designated 1, 3, 5, 7*g*, represents contact *g* of relays 1, 3, 5, and 7 shown in FIG. 2*b* of the Miller system, this single contact representing the series circuit through the four or more counting relay contacts of the reference patent. The series of contacts 1*f* to 7*f*, inclusive, represent contacts *f* of the counting chain relays shown in FIG. 2*b* of the reference patent. For each of these contacts, the numerical prefix represents the relay number controlling the corresponding contact as shown in this prior patent. These contacts thus close in sequence, one on each code step, during each cycle of operation of the counting chain. At the station illustrated in this drawing, it is assumed that no extension units to the field station coding unit are used and that the counting chain operation cycles twice through relays 1 to 8 during the transmission of an indication code. Thus, each indication code transmitted from this station is 16 steps in length.

Another relay identical with that shown in the Miller system (FIG. 2*b*), and here illustrated without control circuits, is the chain repeat relay CR. It is sufficient to understand that this relay is energized and picks up during the final step of the first cycle of operation of the counting chain (code step 8) and is thereafter held energized during the second cycle until the end of the code.

To the left of the timing chain relays is illustrated master relay M which, when energized, picks up to initiate an indication coding action at this station. The circuit for this relay is shown partially in a conventional manner as being completed outside of coding unit FLC over wire 10 from the code starting circuit which is shown in detail in the Miller patent. Inside unit FLC, this circuit further includes back contacts *b*, in series, of timing relays 2L and 1L, to check that no other system coding action is in progress, and thence through the winding of relay M to terminal N. When relay M picks up to close its front contact *a*, a stick circuit is completed, here shown conventionally by a dotted line, which holds relay M energized for the remainder of the indication code as illustrated and described in the aforementioned Miller patent. It is to be understood that the portion of the circuit for relay M external to unit FLC is completed to terminal B of the local source when a change occurs in the conditions of the indication functions at this station or when a code requiring an answer is received from the office or master station location so that the station start relay releases to close the circuit.

Two other relays of the coding unit are illustrated, the first and second transmitter relays 1T and 2T. These relays, identical with the similarly designated relays in the Miller system, control the odd and even numbered code steps, respectively, during the transmission of an indication code from this station. Relay 1T is energized at the beginning of an indication code by the closing of front contacts of relay M. The initial circuit for this relay, similar to that for relay M, starts outside the coding unit in the code starting circuit and extends within the unit over back contacts *c* and *f* of bridging relays LBP and LB, respectively, front contact *e* of relay M, back contact *b* of second transmitter relay 2T, and the winding of relay 1T to terminal N. The closing of front contact *c* of relay 1T completes an obvious circuit for energizing relay 2T, which then picks up. Contact *b* of relay 2T, upon closing in its front contact position, completes a stick circuit for relay 1T which is the same as the original energizing circuit except for including front contact *b* of relay 2T and front contact *a* of relay 1T. Initially, this stick circuit is completed outside of coding unit FLC by the code starting circuit.

Upon the energization of relay LB, the stick circuit for relay 1T is transferred over front contact *f* of relay LB to terminal B at back contact 1, 3, 5, 7*g* of counting chain relay 1—8. Thus, the pickup of relay LB establishes the code stepping circuit for relay 1T which is carried over back contacts *g*, in series, of the odd numbered counting chain relays to terminal B of the local power source. Relay 1T, which controls the length of the odd numbered code steps, is thus in turn controlled, when none of its other stick circuits are completed, by back contacts *g* of the odd numbered counting chain relays as illustrated conventionally in the drawing. When relay LB picks up during the first code step, back contact *g* of relay 1—8 is already open (at relay 1) and thus relay 1T is deenergized. Both of the transmitter relays have slow release characteristics and the release of relay 1T at the end of its slow release period terminates the first code step. As explained in the Miller system, this code step is slightly longer than the usual short code step but is not considered to be a regular long code step in the system used.

The release of relay 1T to end the code step opens the circuit for relay 2T at front contact *c* of relay 1T. However, the closing of the corresponding back contact transfers the winding of relay 2T to a stick circuit including its front contact *a* and wire 11 to external circuitry over station selection contacts of the pyramid relays. If the station selection circuitry is open at the beginning of the second code step, relay 2T is deenergized immediately and releases at the end of its slow release period to terminate the second code step. Thus, the length of the even numbered code steps is established by the period of time during which relay 2T maintains its front contacts closed, the minimum time being the slow release period of the relay. Relay 1T has a similar stick circuit which includes its own front contact *a* and wire 12 to the station selection circuits. During the following old numbered code steps in the first half of the code, relay 1T may be held energized after the opening of contacts 1, 3, 5, 7*g* of relay 1—8 through the station selection circuitry to establish a long code step. If station selection circuitry is open, the length of the old numbered code step is established by the release time of relay 1T. The station selection circuits are controlled by the pyramid relays which in turn are controlled, to open the station selection circuitry, by various contacts of the timing chain relays. This entire operation is fully described in the aforementioned Miller patent and reference is made thereto for complete detail and description of the operation. It is sufficient here to understand that, during the first half of the indication code, transmitter relay 1T and 2T are controlled to transmit long and short code steps as established by the station selection circuits. Other stick circuits for the transmitter relays which are effective during the latter half of the code will be discussed hereinafter.

Line relay R is shown in the lower left of the drawing. This relay is of the biased type, as is usual in this type of system, in order that the correct operation may be obtained in accordance with the polarity of the line circuit at various times. It is sufficient to understand for the present invention that relay R follows control codes received over the line circuit as transmitted from the office. Under such conditions, the station circuit may be traced from line wire Y over back contact *b* of relay M, the winding of relay R in the direction of the arrow, and back contact *d* of relay M to line wire Z. During such codes, relay R is periodically energized and deenergized and the corresponding operation of its contacts *a* and *b* between their front and back positions drives coding unit FLC to record such control codes. This operation is explained in the reference patent and additional detail is not necessary here for an understanding of my invention.

During the transmission of indication codes, relay R is controlled by relay 1T to follow the transmitted indication code and in turn drive the coding unit to advance the coding action to complete the indication code. During indication codes, at such times when relay 1T is released, the circuit for relay R is traced from line wire Y over front contact *b* of relay M which is closed during indication codes, the winding of relay R, back contact *b* of relay 1T, and front contact *d* of relay M to line wire Z. When relay 1T is energized and picks up, a shunt is placed on the line circuit extending from line wire Y over front contact *b* of relay 1T and front contact *d* of relay M to line wire Z. During the first code step, prior to the pickup of relay 1T, an initial shunt is established from line wire Y over back contact *f* of relay LBP and front contact *d* of relay M to line wire Z. The periodic operation of contact *b* of relay 1T thus alternately connects relay R to the line circuit and places a shunt on the line circuit. It is to be noted that the polarity of the line circuit under indication coding conditions is reversed by the office apparatus. However, a full description of this operation is contained in the aforementioned Miller patent and reference is again made to that patent, since a full description of the operation is not here necessary for an understanding of my present invention.

Another relay is provided which is not used in the previous system of the Miller patent, the master and station repeater relay MSP. This relay repeats the energized condition of master relay M and the completion of the station selection transmission during the indication code. The energizing circuit for relay MSP includes front contact *c* of relay M, a front contact S, and the winding of relay MSP. Contact S is closed upon the completion of the transmission of the station selection code representing the local station, that is, as explained in the prior reference, at the end of the third long code steps of the station selection portion of the indication code. Front contact S is thus closed during an indication code only upon the completion of the transmission of the station designation to the office. This contact is likewise closed during the reception of a control code from the office intended for the station illustrated herein. But under such conditions, front contact *c* of relay M is open and thus relay MSP is not energized. Relay MSP, once energized, is held energized by its circuit until the termination of the indication code.

At the right of the drawing, a condition responsive encoder device PE is illustrated by a conventional dot-dash rectangle. It is assumed that this encoder is used to convert a pressure reading in conventional units such as pounds per square inch into a binary code form suitable for transmission in the time code system used herein. This encoder may be any one of several types of such devices available in the art. Particularly, it may be similar to the encoders shown and described in the copending application for Letters Patent of the United States Serial No. 642,468 filed February 26, 1957 by A. P. Jackel for Code Converters, now Patent No. 2,934,754, issued April 26, 1960. Briefly, circuits are established between terminal 13A and any one of the terminals 1A to 7A, inclusive, over the data switches closed in combination in accordance with the data being encoded. The output from terminals 1A to 7A, inclusive, is a binary code arrangement in which a terminal is energized for the numeral 1 and is deenergized for the numeral 0 in the binary code form. In the aforementioned Jackel patent, a larger encoder is shown which has a twelve digit output. However, for purposes of the present description, a seven digit output is sufficient for an understanding thereof. It is to be understood, of course, that any size or type of encoder may be used. It is a characteristic of such encoders that the contacts or brushes, represented conventionally within the dot-dash rectangle PE, will not carry sufficient current to handle directly the energization of transmitter relays 1T and 2T.

In the aforementioned Jackel patent, each encoder brush or contact is repeated by an individual repeater relay which in turn controls, at the proper time, the transmission of individual code steps. Herein, according to my invention, two repeater relays only are used, the first and second transmitter stick relays 1TS and 2TS. Each of these transmitter stick relays is of the type which requires only a small energizing current for operation. Also, the operation of these relays, when energized, is rapid in nature in order to assure that front contacts will close during a short period of energization. Relay 1TS is energized when appropriate during the odd numbered code steps. For example, one circuit may be traced from terminal B at terminal 13A of device PE through circuits completed within the encoder to terminal 1A and thence over front contact *a* of relay MSP, front contact 1*f* of relay 1—8, and the winding of relay 1TS to terminal N. Other similar circuits are at times completed over front contacts 3*f*, 5*f*, and 7*f* of relay 1—8. Relay 2TS is energized during even numbered code steps, when appropriate, by circuits completed within device PE from terminal 13A to terminals 2A, 4A, and 6A, respectively. These circuits are further completed, as an example, from terminal 2A over front contact *b* of relay MSP and front contact 2*f* of relay 1—8 to the winding of relay 2TS. It is to be remembered that contacts 1*f* to 7*f*, inclusive, of relay 1—8 represent, in accordance with the numerical prefix, the front contact *f* shown in the Miller patent for each counting chain relay. It is to be further understood that during coding action these front contacts 1*f* to 7*f* are closed in sequence, one during each code step during each cycle of operation of the counting chain relays 1 to 8. Thus, two sequences of closing of these contacts occur during the transmission of an indication code. Circuits for relays 1TS and 2TS are completed only if the brushes in device PE are in proper position to encode the numeral 1, in the binary code form of the information to be transmitted, during the corresponding code step.

Relays 1TS and 2TS provide stick circuits for transmitter relays 1T and 2T, respectively. The stick circuit for relay 1T may be traced from terminal B over front contact *a* of relay 1TS, front contact *e* of relay CR, front contact *c* of relay LP in multiple with front contact *e* of relay 1L, and front contact *a* and the winding of relay 1T to terminal N. The similar circuit for relay 2T includes, in addition to front contact *a* of relay 2T, back contact *c* of relay 1T, front contact *e*, in multiple, of relays 2L and LP, front contact *f* of relay CR, and front contact *a* of relay 2TS. These circuits, once established, exist until the opening of the multiple circuit through the timing relay contacts included in the particular stick circuit involved. In actual operation, this will occur finally at the front contact of relay LP included in the stick circuit, that is, at front contact *c* or front contact *e* of this latter relay. Upon the interruption of the stick circuit, the transmitter relay, which is thus deenergized, releases at the end of its slow release period.

I shall now describe briefly the operation of the system including the circuits of my invention during the transmission of an indication code from the illustrated station. The operation begins with a change in the data recorded which requires that the information be transmitted to the office or with the reception of a data transmission request from the central office location. Whichever action occurs, the station start relay releases to complete the portion of the code start circuit external to unit FLC, illustrated conventionally by line 10. As previously explained, providing that no other coding action is progressing in the remote control system, master relay M is thus energized to initiate the indication code, the at-rest condition of the system being established by the closed condition of back contacts *b* of relays 1L and 2L included in the portion of the start circuit within unit FLC.

Relay M, thus energized, picks up to energize relay 1T, as previously described. In addition, the opening of back contacts *b* and *d* and the closing of the corresponding front contacts of relay M pole-change the line circuit connections and also establish immediately a shunt on the line circuit through back contact *f* of relay LBP, as previously traced. Relay 1T shortly picks up, energizing relay 2T and providing a second shunt on the line circuit connections over front contact *b* of relay 1T. The shunt on the line circuit deenergizes line relay R which releases to energize the timing chain relays which pick up in sequence, as previously described in this specifictaion and as fully described in the aforementioned Miller patent. The release of relay R also energizes the first counting chain relay so that, as illustrated conventionally in the present system, contact 1, 3, 5, 7*g* of relay 1—8 opens. Thus when relay LB eventually picks up, the opening of its back contact *f* and the closing of the corresponding front contact deenergizes relay 1T which releases to end the first code step.

The coding action continues with relays 1T and 2T alternately picking up and releasing. Each of these relays is held energized to create a long code step during the first half of the indication code by the station selection circuits established over wires 11 and 12, as previously described. When the final station selection step is transmitted, contact S is closed. This energizes relay MSP over the circuit including contact S and front contact *c* of relay M. Although this may occur early enough in the indication code that relays 1TS and 2TS may be energized during the latters steps in the first half of the code, the closing of front contacts of relays 1TS and 2TS is ineffective due to the open front contacts of relay CR which is released during this time.

During the eighth step of the indication code in the system here used, with station selection already made, relay CR is energized and picks up. This relay thereafter holds energized during the remainder of the coding action. The full description of this operation is to be had in the aforementioned Miller patent.

I shall now assume that the numeral 1 is to be transmitted at least during the first and second digits of the binary data code representing the existing conditions. In other words, connection is made through the contacts of encoder PE between terminal 13A and terminals 1A and 2A. On the ninth step of the code, which is the first step following the station selection portion of an indication code, relay 1TS is then energized, the circuit extending from terminal B at terminal 13A, through the internal circuits of device PE to terminal 1A, and thence front contact *a* of relay MSP, front contact 1*f* of relay 1—8, and the winding of relay 1TS to terminal N. Relay 1TS closes its front contact *a* to immediately establish a stick circuit for relay 1T which, during the ninth, an odd numbered code step, is already energized. The stick circuit further includes front contact *e* of relay CR, front contacts *c* and *e*, in multiple, of relays LP and 1L, respectively, and front contact *a* of relay 1T. This stick circuit holds relay 1T energized until it is eventually interrupted by the sequential release of relays 1L and LP. These latter relays provide the major portion of the long time period by which step nine indicates the numeral 1. Relay 1T, when deenergized, releases at the expiration of its own slow release period. This terminates the ninth code step and begins the following tenth code step. Relay 1TS releases as a result of the opening of front contact 1*f* of relay 1—8.

Meanwhile, front contact 2*f* is closed to indicate the tenth code step and relay 2TS is immediately energized, the circuit further including front contact *b* of relay MSP and the internal connections of device PE between terminals 13A and 2A. Relay 2TS establishes a stick circuit for holding relay 2T energized, the circuit including front contact *a* of relay 2TS, front contact *f* of relay CR, front contacts *e*, in multiple, of relays 2L and LP, front contact *a* of relay 2T, and back contact *c* of relay 1T which is closed at this time. This stick circuit holds relay 2T energized to create a long code step to designate the numeral 1 in this position of the binary code. The stick circuit is eventually interrupted by the cascaded release of relays 2L and LP, in that order. Relay 2T, thus deenergized, releases at the end of it own slow release period to terminate the tenth code step. The opening of contact 2*f* at the beginning of the eleventh code step releases relay 2TS.

The coding action continues in a similar manner until the end of the code. Relays 1TS and 2TS are alternately energized, as contacts 3*f* to 7*f*, inclusive, are closed in sequence during the remaining code steps, if the corresponding internal circuits of device PE are completed between terminal 13A and terminals 3A to 7A, inclusive, in order. In other words, each time that the binary code being transmitted requires the numeral 1 in a digit position, relay 1TS or 2TS is energized depending upon whether the code step is odd numbered or even numbered. If the transmitter stick relay is energized, the corresponding transmitter relay is held energized to create a long code step. If the stick relay is not energized, the code step is of a short nature as determined by the release time of relay 1T or 2T, this code stepping being controlled by contact 1, 3, 5, 7*g* of relay 1—8. At the end of this indication code, all of the relays in station coding unit FLC release including the timing chain relays, ending with relay 1L in the manner described in the Miller patent. The line circuit connections are restored to normal and relay R is held energized in its normal at-rest condition.

It is obvious, therefore, that the circuit arrangement provided by my invention allows two transmitter stick relays to alternately repeat the position of the encoder device and, in turn, to control the transmission of long code steps during the resulting indication codes. The circuit arrangement allows for the inability of the encoder brushes or contacts to handle sufficient current to control the transmitter relays of the coding unit and yet eliminates the necessity of a repeater relay for each digit of the binary code resulting from the conversion action of the encoder. The arrangement utilizes the standard circuit details within coding unit FLC without change except in the modification of the external connections which are readily available. Thus, standard coding units may be used at each station in the system in which the arrangement of my invention is utilized. The resulting action and operation of the system is less cumbersome and more efficient in the utilization of the relays provided.

Although I have herein shown and described but one form of remote control system embodying the indication transmitting circuit arrangement of my invention, it is to be understood that various changes and modifications may be made therein within the scope of the appended claims without departing from the spirit and scope of my invention.

Having thus described my invention, what I claim is:

1. In a coded remote control system including an office and at least one station connected by a communication channel over which coded indication functions are transmitted from said station to said office to provide indications of the condition of selected station apparatus, the indication codes consisting of sequences of code steps in which each indicated condition is characterized by the relative length of the assigned code step, the combination at said station comprising, a code transmitting means having connections to said channel for transmitting the indication codes from said station to said office, an indicating means for recording the conditions of the selected apparatus, stepping means including a series of contacts and controlled by said transmitting means for successively closing said contacts in sequence one during each step of the transmitted code, and a pair of code characterizing relays having connections to said indicating means and controlled by said stepping means contacts for alternately registering in sequence one during each code step each of the conditions recorded in said indicating means, said code characterizing relays having other connections to said code transmitting means for successively establishing the length of the indicating code steps in accordance with the sequentially registered conditions.

2. At a remote station location in a remote control system in which indication codes are transmitted over a communication channel from said station to a central office recording location to provide information of the first or second condition of preselected station apparatus, in combination, a code transmitter relay means having connections for transmitting the successive pulses of an indication code over said channel, a stepping means for periodically opening and closing a stepping circuit, said stepping circuit having connections to said transmitter relay means for controlling the stepping of the indication code in a sequence of short pulses which provide first condition indications of said apparatus, control circuit means controlled by said transmitter relay means and having connections for advancing said stepping means one step for each transmitted code pulse, an indicating device for recording a series of second condition indications of said apparatus, a series of code step selecting contacts controlled by said stepping means to be closed and reopened in sequence one contact during each successive code a pair of code characterizing relays and energizing circuits therefor alternately controlled by said device and by said selecting contacts for energizing one of said characterizing relays during a code step when said device indicates a second condition for the apparatus associated with that code step, and a code characterizing circuit means controlled by energized position contacts of said characterizing relays and connected to said transmitter relay means for superimposing a longer code step upon the stepping of the indication code to transmit a second condition indication when one of said characterizing relays is energized during a particular code step.

3. In a remote control system including a control office and at least one remote station connected by a communication channel over which indication functions are transmitted by code pulses from said station to said office to provide information of the first or second condition of a sequence of selected station apparatus, an indication code comprising a sequence of successive code steps by which the indications are characterized, in combination at said station, a transmitter relay means having connections to said channel for transmitting the successive code steps to said office, a stepping means operatively controlled by said transmitter relay means for pulsing in a series of successive steps, a first circuit means controlled by said stepping means and connected to said transmitter relay means for stepping that relay means to transmit a series of first condition indications, an indicating means for recording in sequence the conditions of said selected apparatus, a pair of indication characterizing relays alternately controlled by said stepping means and operably connected to said indicating means for successively registering the sequence of recorded conditions one during each indication step of a transmitted code, and a second circuit means controlled by said characterizing relays and connected to said transmitter relay means for superimposing a second condition character upon the stepping from said stepping means during a particular code step when a second condition indication is registered by one of said characterizing relays.

4. In a remote control system including a control office and at least one remote station connected by a line circuit over which indication functions are transmitted by code pulses from said station to said office to provide information of the first or second condition of a sequence of selected station apparatus, an indication code comprising a sequence of successive code steps by which the indications are characterized, in combination at said station, a transmitter relay operable alternately to a first and a second position to produce the steps of an indication code, line circuit connections including a contact of said transmitter relay for controlling the transmission of the indication codes to said office, an energizing circuit for said transmitter relay including at least one stepping contact which periodically opens and closes to operate that relay to its first and second position to transmit indications of said first condition, a transmitter stick relay and an energizing circuit therefor including a counting contact closed only during a preselected step of an indication code and an encoder contact closed to register a second condition of a selected station apparatus, and a stick circuit for said transmitter relay including an energized position contact of said stick relay and a timing contact closed for a selected time interval after said stick relay is energized to hold said transmitter relay energized to transmit a second condition indication during said preselected code step when the corresponding apparatus has assumed its second condition.

5. In a remote control system including a control office and at least one remote station connected by a line circuit over which indication functions are transmitted by indication code from said station to said office to register the first or second position of each of a plurality of station devices, an indication code comprising a sequence of successive indication pulses by which the indication functions are individually characterized, in combination at said station, a transmitter relay operable alternately to a first and a second position to produce the successive indication pulses, line circuit connections including contacts of said transmitter relay for controlling the transmission of indication codes to said office, a stepping means with connections to said transmitter relay for periodically operating that relay between its first and its second positions to transmit indication pulses characterizing the first position of the corresponding devices, a transmitter stick relay and an energizing circuit therefor including a counting contact controlled by said stepping means to be closed only udring a predetermined one of said indication pulses and an encoder contact closed to indicate occupancy of a second position by the station device corresponding to said predetermined indication pulse, and a characterizing circuit including an energized position contact of said transmitter stick relay and a timing contact responsive to the transmission of said predetermined indication pulse and closed during a preselected time interval after said stick relay is energized to hold said transmitter relay in its operated position to superimpose a second position character on said predetermined code pulse when the corresponding station device occupies its second position.

6. In a remote control system including a control office and at least one remote station connected by a line circuit over which indication functions are transmitted by indication code from said station to said office to register the first or second position of each of a plurality of station devices, an indication code comprising a sequence of successive indication pulses by which the indication functions are individually characterized, in combination at said station, a transmitter relay operable alternately to a first and a second position to produce the successive indication code pulses, line circuit connections including contacts of said transmitter relay for controlling the transmission of indication codes to said office, a stepping means responsive to the indication code on said line circuit and having connections for periodically operating said transmitter relay between its first and second positions to transmit indication pulses characterizing the first position of said station devices; a transmitter stick relay and an energizing circuit network therefor comprising a plurality of circuit paths connected in multiple, each path including a counting contact controlled by said stepping means to be closed only during a predetermined indication pulse different from the pulses associated with the other circuit paths and an encoder contact closed to indicate the occupancy of the second position by the station device corresponding to said predetermined indication pulse; and a characterizing circuit including an energized position contact of said transmitter stick relay and a timing contact responsive to the transmission of said predetermined indication pulse and closed during a preselected time interval after said stick relay is energized to hold said transmitter relay in its operated position to superimpose a second position character on said predetermined indication pulse when the corresponding station device occupies its second position.

7. In a remote control system including a control office and at least one remote station connected by a line circuit over which indication functions are transmitted by indication code from said station to said office to register the first or second position of each of a plurality of station devices, an indication code comprising a sequence of successive indication pulses by which the indication functions are individually characterized, in combination at said station, a transmitter relay operable alternately to a first and a second position to produce the successive indication code pulses, line circuit connections including contacts of said transmitter relay for controlling the transmission of indication codes to said office, a stepping means responsive to the indication code on said line circuit and having connections for periodically operating said transmitter relay between its first and second positions to transmit indication pulses characterizing the first position of said station devices; a first and a second transmitter stick relay and an energizing circuit network therefor comprising a plurality of circuit paths connected alternately to said first and said second transmitter stick relay, each circuit path including a counting contact controlled by said stepping means to be closed only during a preselected indication pulse different from the pulses associated with the other circuit paths and an encoder contact closed when the station device corresponding to said preselected indication pulse occupies its second position; a first characterizing circuit including an energized position contact of said first transmitter stick relay and a timing contact holding closed for a selected time interval after said transmitter relay operates to its first position, said first characterizing circuit having connections to hold said transmitter relay in its first position to superimpose a second position character on the transmitted indication pulse when the station device corresponding to that pulse is occupying its second position, and a second characterizing circuit including an energized position contact of said second transmitter stick relay and a timing contact holding closed for a selected time interval after said transmitter relay operates to its second position, said second characterizing circuit having connections for holding said transmitter relay in its second position to superimpose a second position character on the transmitted indication pulse when the station device corresponding to that pulse is occupying its second position.

References Cited in the file of this patent

UNITED STATES PATENTS

| | | |
|---|---|---|
| 2,411,375 | Jackel | Nov. 19, 1946 |
| 2,442,603 | Jackel | June 1, 1948 |
| 2,698,425 | Miller | Dec. 28, 1954 |
| 2,790,158 | Hays | Apr. 23, 1957 |